(12) United States Patent
Li

(10) Patent No.: US 9,400,569 B2
(45) Date of Patent: Jul. 26, 2016

(54) THREE DIMENSIONAL BUILDING BLOCKS

(75) Inventor: Kevin A. Li, Chatham, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 954 days.

(21) Appl. No.: 13/303,185

(22) Filed: Nov. 23, 2011

(65) Prior Publication Data

US 2013/0127828 A1 May 23, 2013

(51) Int. Cl.
*G06F 3/0354* (2013.01)
*G06F 3/042* (2006.01)

(52) U.S. Cl.
CPC ............ *G06F 3/0354* (2013.01); *G06F 3/0425* (2013.01)

(58) Field of Classification Search
None
See application file for complete search history.

(56) References Cited

U.S. PATENT DOCUMENTS

| | | | |
|---|---|---|---|
| 3,237,341 A | 3/1966 | Janning | |
| 3,696,548 A | 10/1972 | Teller | |
| 3,712,622 A | 1/1973 | Odier | |
| 3,927,948 A | 12/1975 | Cox et al. | |
| 4,275,449 A | 6/1981 | Aish | |
| 4,605,231 A | 8/1986 | Richman | |
| 5,876,262 A | 3/1999 | Kelly et al. | |
| 6,256,719 B1 | 7/2001 | Frankel | |
| 6,526,375 B1 | 2/2003 | Frankel et al. | |
| 6,741,245 B1 | 5/2004 | Marks et al. | |
| 7,082,387 B1 | 7/2006 | Wolfe, Jr. | |
| 7,322,873 B2 | 1/2008 | Rosen et al. | |
| 7,731,558 B2 | 6/2010 | Capriola | |
| 7,846,002 B1 | 12/2010 | Mikesell et al. | |
| 2002/0126085 A1* | 9/2002 | Cohen et al. | 345/156 |
| 2006/0096960 A1* | 5/2006 | Carson et al. | 219/121.68 |
| 2010/0164953 A1 | 7/2010 | Wouhaybi et al. | |
| 2011/0215998 A1* | 9/2011 | Fitzgerald et al. | 345/156 |

OTHER PUBLICATIONS

Schweikardt et al.; "roBlocks: A Robotic Construction Kit for Mathematics and Science Education;" ACM ICMI'06, Nov. 2-4, 2006, Banff, Alberta, Canada; pp. 72-75.*

Baudisch, et al., Lumino: Tangible Blocks for Tabletop Computers Based on Glass Fiber Bundles, *CHI 2010*, Apr. 10-15, 2010, Atlanta, Georgia, USA.

Hoover, et al., Augmented Reality, Surface Style, *CHI 2010*, Apr. 10-15, 2010, Atlanta, Georgia, USA.

* cited by examiner

*Primary Examiner* — Edward Martello
(74) *Attorney, Agent, or Firm* — Scott P. Zimmerman, PLLC

(57) ABSTRACT

Methods, systems, and products describe physical structures for interactive computer displays. A tangible, three-dimensional structure has an interior and an exterior surface. A bundle of optical fibers propagates light through the interior to the exterior surface of the three-dimensional structure. A magnet in the three-dimensional structure produces an attractive force, and a marker on the exterior surface identifies the three-dimensional structure and the magnet.

20 Claims, 13 Drawing Sheets

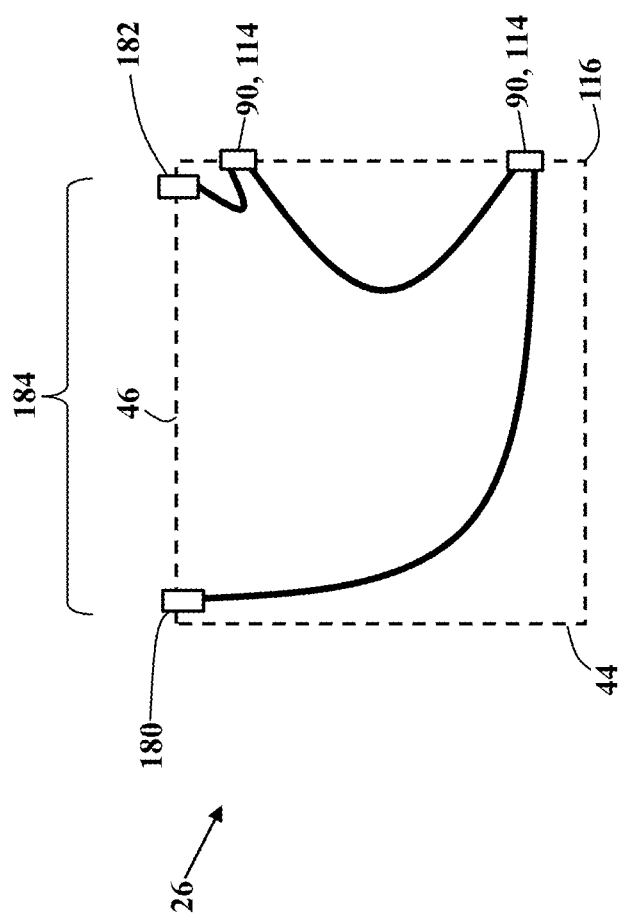

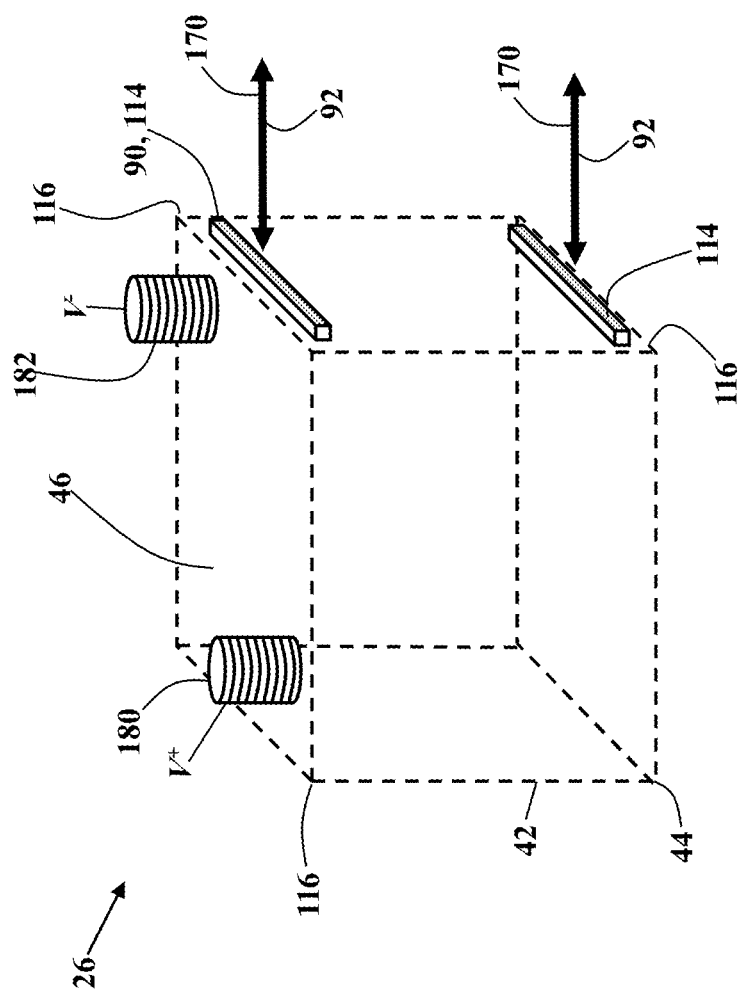

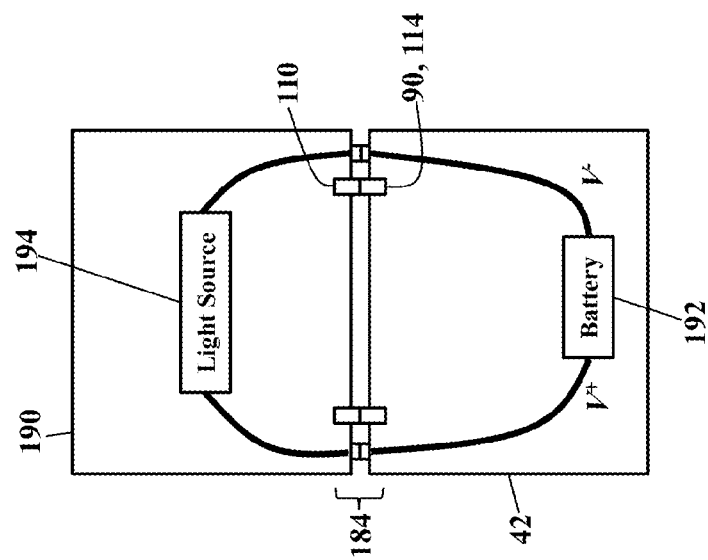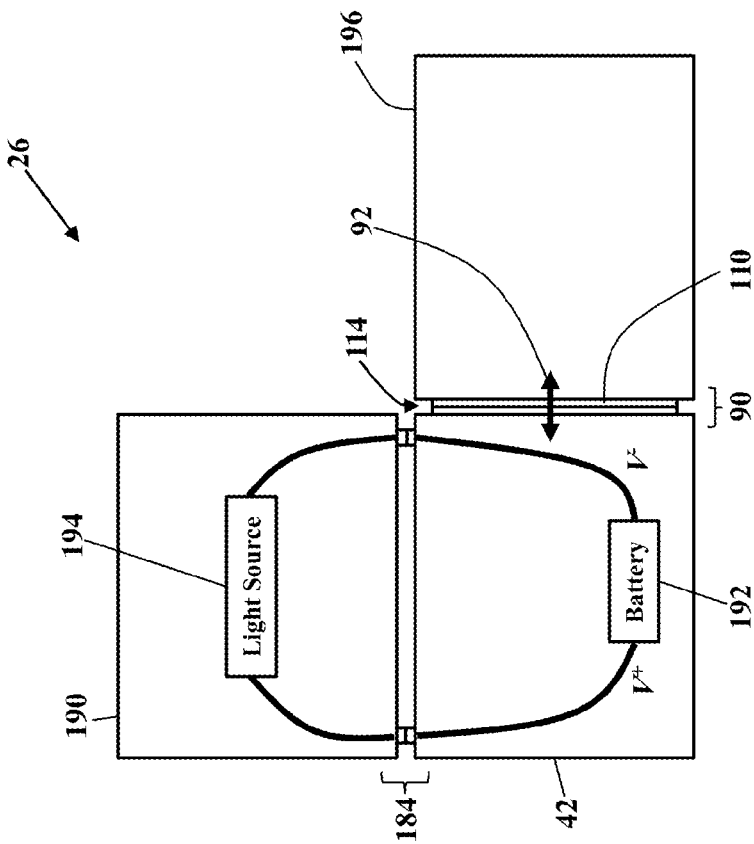

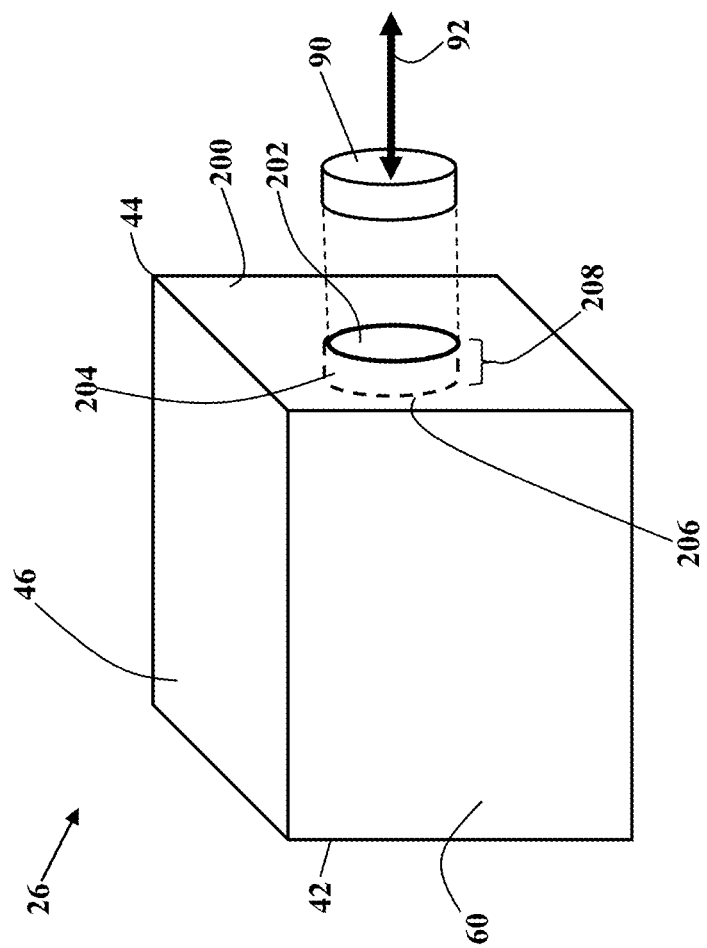

THREE DIMENSIONAL BUILDING BLOCKS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Tabletop computers use physical building blocks to construct three-dimensional structures. As the building blocks are placed on an interactive display, the tabletop computer maps a location and an identity of each building block. Engineers and architects may thus move the building blocks to create computer models of three-dimensional buildings and other structures.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 7-8 are more schematics illustrating the magnet, according to exemplary embodiments;

FIG. 10 is a schematic illustrating a three-dimensional structure, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
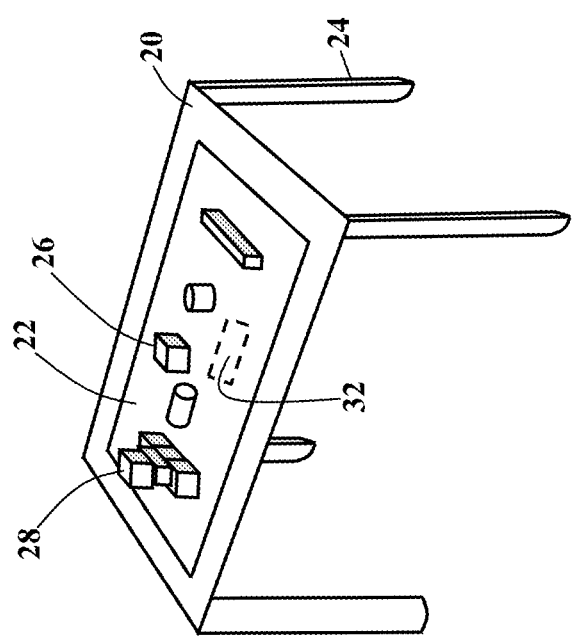
FIG. 1 is a simplified schematic illustrating an operating environment, according to exemplary embodiments.

FIG. 1 is a simplified schematic illustrating an operating environment, according to exemplary embodiments. A surface computer 20 has an interactive display 22. One or more legs 24 may support the surface computer 20, such that the interactive display 22 is generally flat or horizontal like a table. The interactive display 22, however, may have any orientation. Regardless, a designer, architect, or other user may place building blocks 26 onto the interactive display 22. The user arranges the building blocks 26 into a physical model 28 of any structure. The building blocks 26 may have a variety of shapes, thus allowing the user to build models of buildings, cars, component parts, or any other structure. As the user places and/or stacks the building blocks 26, an internal camera 32 peers upward through the interactive display 22 and captures digital pictures of an arrangement of the building blocks 26. The surface computer 20 analyzes the digital pictures and maps a location and identity of each building block 26. The surface computer 20 may thus create a computer model of the physical model 28 built atop the interactive display 22. Because surface computers are known to those of ordinary skill in the art, this disclosure need not provide a detailed explanation. Moreover, as later paragraphs will explain, the building blocks 26 may be used with any processor-controlled device.

Figure 2:
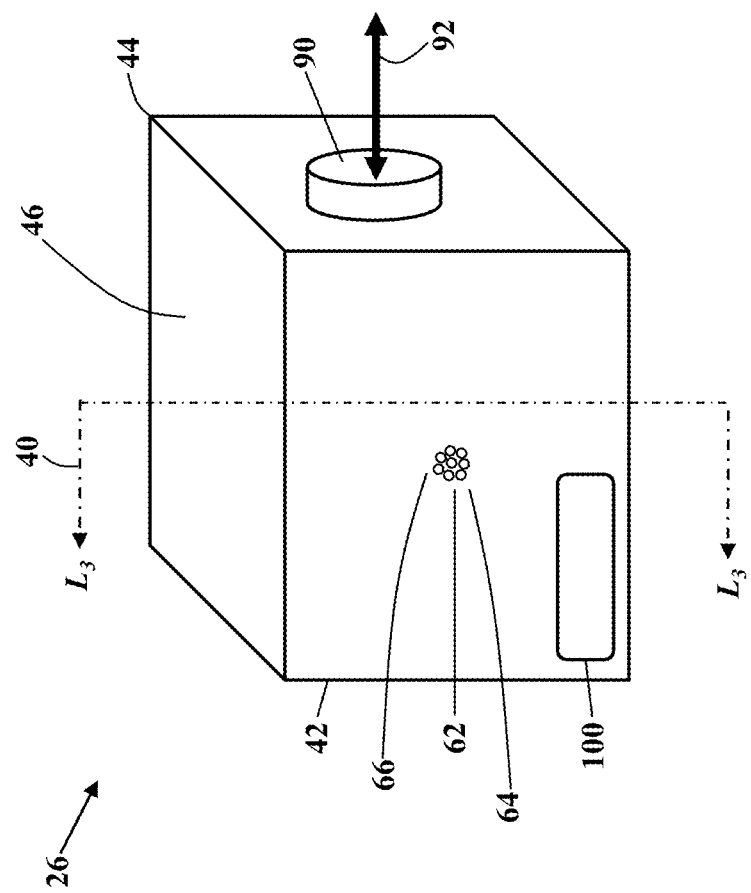
FIGS. 2 and 3 are detailed schematics illustrating an individual building block, according to exemplary embodiments.
Figure 3:
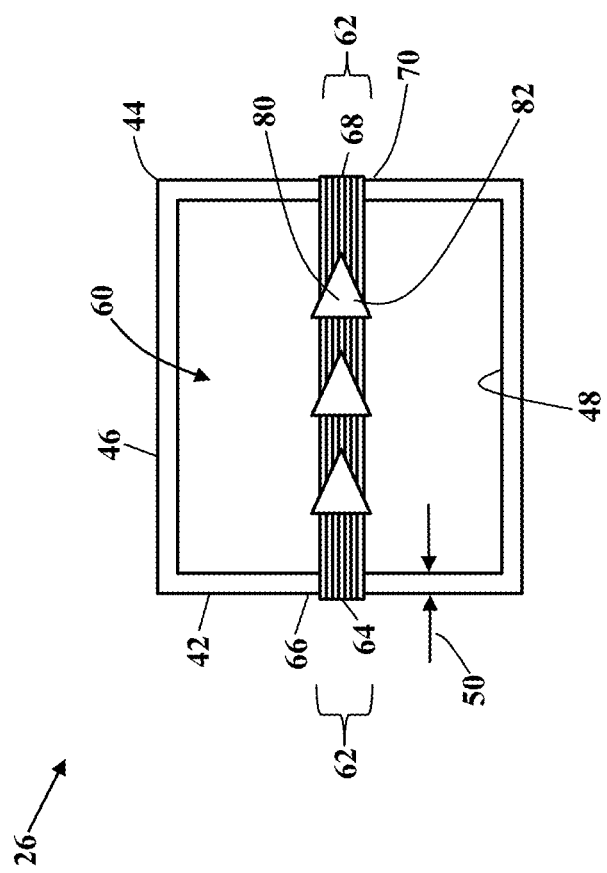

FIGS. 2 and 3 are detailed schematics illustrating an individual building block 26, according to exemplary embodiments. FIG. 2 is a front view of the building block 26, while FIG. 3 is a sectional view taken along line $L_3$-$L_3$ (illustrated as reference numeral 40) of FIG. 2. The building block 26 has a three-dimensional structure 42, which is illustrated as a simple six-sided cube 44. The building block 26, however, may have any shape, as later paragraphs will explain. The three-dimensional structure 42 has an exterior surface 46, an interior surface 48, and a wall thickness 50 between the exterior surface 46 and the interior surface 48. The interior surface 48 at least partially encloses an interior 60. The three-dimensional structure 42 may thus be entirely hollow or at least partially filled with any material, such as an acrylic or other polymer. The wall thickness 50 may be uniform, or the wall thickness 50 may vary, to suit any design or use.

The three-dimensional structure 42 also includes a bundle 62 of optical fibers. The bundle 62 of optical fibers has a first end 64 at a first location 66 on the exterior surface 46 of the three-dimensional structure 42. The bundle 62 of optical fibers has an opposite second end 68 at a second location 70 on the exterior surface 46 of the three-dimensional structure 42. Each end 64 and 68 may terminate at, or near, the exterior surface 46 of the three-dimensional structure 42. The bundle 62 of optical fibers propagates light 80 through the interior 60 to the exterior surface 46 of the three-dimensional structure 42. The light 80 represents any image 82 that is propagated through the interior 60 of the three-dimensional structure 42. That is, the bundle 62 of optical fibers propagates the image 82 from the first location 66 on the exterior surface 46 of the three-dimensional structure 42 to the second location 70 on the exterior surface 46.

The three-dimensional structure 42 also includes a magnet 90. The magnet 90 may be any material having any magnetic property. The magnet 90 may molded into the interior 60 of the three-dimensional structure 42. The magnet 90, however, may be attached to the exterior surface 46 of the three-dimensional structure 42. The magnet 90, for example, may be adhered to the exterior surface 46 using an adhesive or mechanical fastener (such as an adhesive glue or tape, threaded screw, or hook and loop). The magnet 90 may even insert into a pocket, cavity, or well that is molded or machined into the exterior surface 46 of the three-dimensional structure 42. The magnet 90 may also protrude from the exterior surface 46 of the three-dimensional structure 42. Regardless, the magnet 90 produces a force 92 that may magnetically attract or repel another building block, as later paragraphs will explain.

The three-dimensional structure 42 may also include a marker 100. The marker 100 may be visible from the exterior surface 46 of the three-dimensional structure 42. The marker 100, for example, may be a label that is adhesively adhered to the exterior surface 46. The marker 100 may also be molded or machined into the exterior surface 46. Regardless, the marker 100 displays or conveys some information that uniquely identifies the three-dimensional structure 42 and/or the magnet 90. The marker 100 may be a bar code, alphanumeric text, or any other information that allows the camera 32 to uniquely identify the three-dimensional structure 42 and the magnet 90 associated with the three-dimensional structure 42. The surface computer 20 may thus map the location of the three-dimensional structure 42 and the associated magnet 90.

Figure 4:
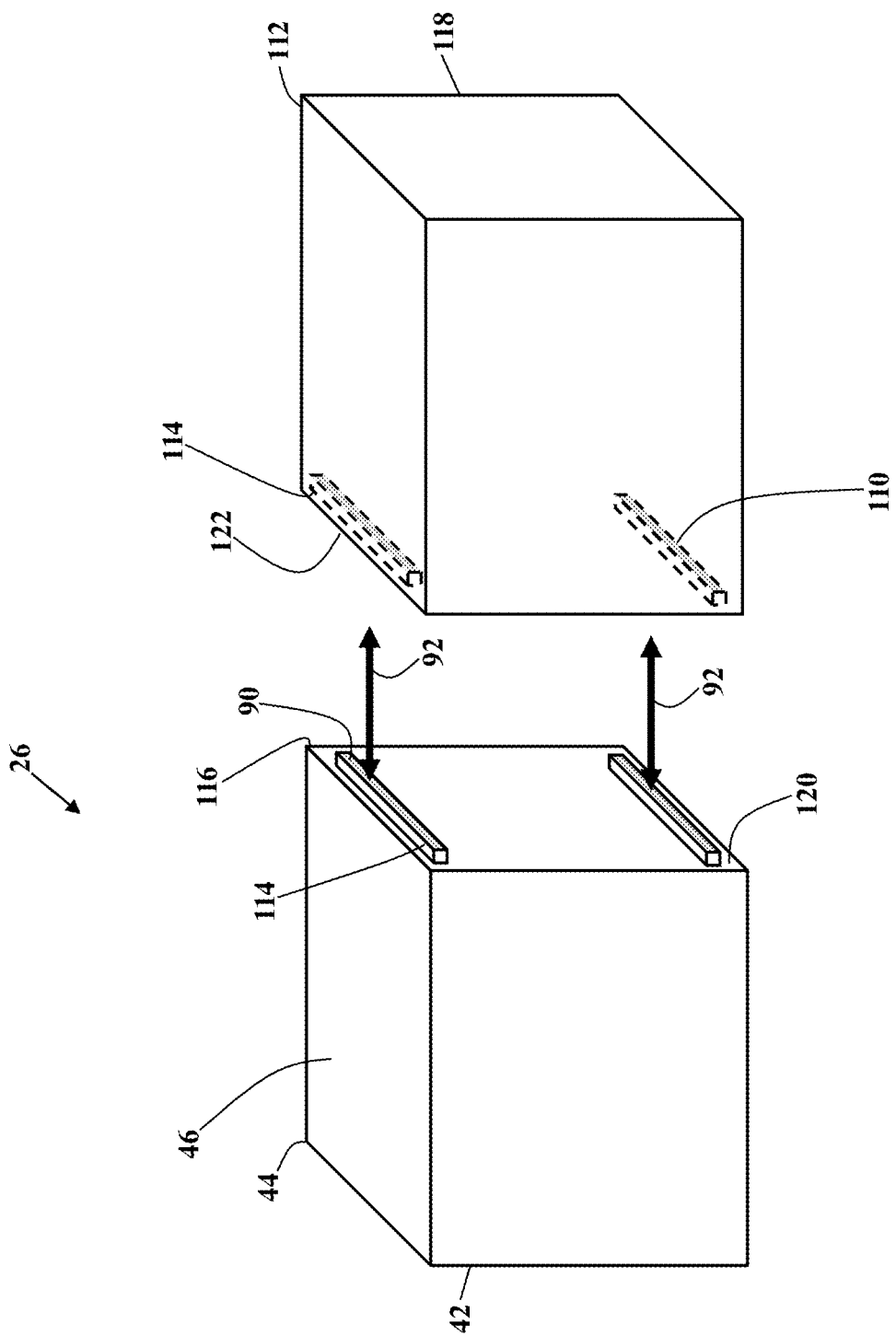
FIG. 4 is a schematic illustrating magnetic attraction, according to exemplary embodiments.

FIG. 4 is a schematic illustrating magnetic attraction, according to exemplary embodiments. Because the three-dimensional structure 42 includes the magnet 90, the three-dimensional structure 42 may magnetically attract (or be attracted to) any magnetic material 110 on or in a companion structure 112. FIG. 4, for example, illustrates one or more edge magnets 114 oriented near or at any corner edge 116 of the three-dimensional structure 42 (e.g., the six-sided cube 44). The edge magnets 114 magnetically attract the magnetic material 110 on or in the companion structure 112. The companion structure 112, for simplicity, is illustrated as another six-sided cube 118, such that a side 120 of the three-dimensional structure 42 may abut a companion side 122 of the companion structure 112. The companion structure 112 is also illustrated as having the edge magnets 114, such that the attractive force 92 draws the companion structure 112 toward the three-dimensional structure 42. The strength of the magnetic attraction may be related to the magnetic properties of the edge magnets 114, the magnetic material 110 in the companion structure 112, and perhaps even the shape and material of the three-dimensional structure 42 and the companion structure 112.

Figure 5:
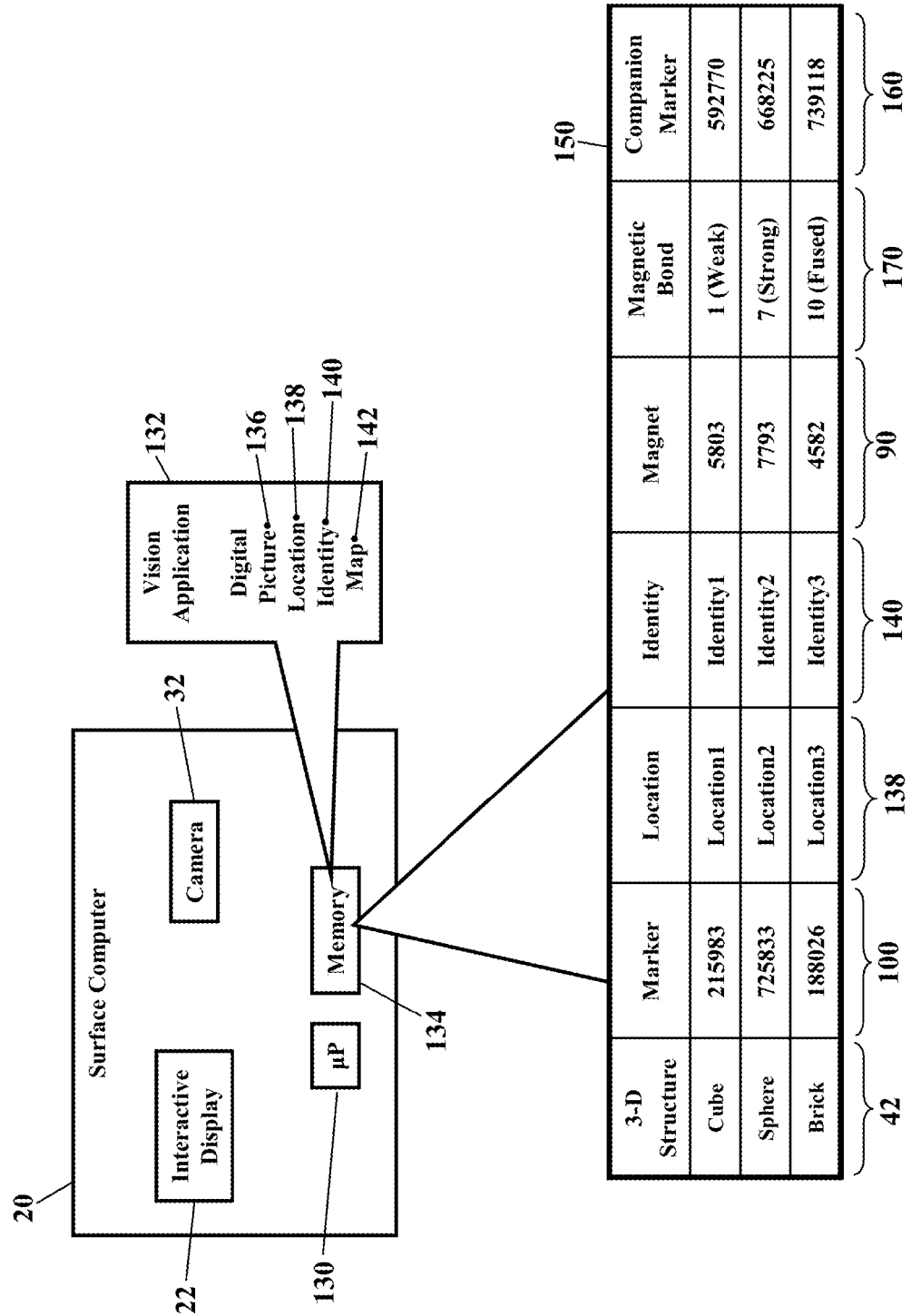
FIG. 5 is a block diagram illustrating a surface computer, according to exemplary embodiments.

FIG. 5 is a block diagram illustrating the surface computer 20, according to exemplary embodiments. The surface computer 20 has a processor 130 (e.g., "µP"), application specific integrated circuit (ASIC), or other component that executes a vision application 132 stored in a memory 134. The vision application 132 has code or instructions that cause the processor 130 to instruct the camera 32 to capture the digital picture 136 of the building blocks (illustrated as reference numeral 26 in FIG. 1) arranged on the interactive display 22. The processor 130 stores the digital picture 136 in the memory 134. As this disclosure explained, the vision application 132 causes the processor 130 to determine the location 138 and identity 140 of the building blocks 26. The processor 130 may then generate a map 142 of each three-dimensional structure 42 arranged on the interactive display 22.

FIG. 5, for simplicity, illustrates the map 142 as a table 150. FIG. 5 illustrates the table 150 stored in the memory 134 of the surface computer 20, but the table 150 may be remotely located and accessed from any network location or device. The table 150, for example, may be stored and accessed from a local network or the Internet. Regardless, the table 150 may contain an entry for each three-dimensional structure 42 arranged on the interactive display 22. The table 150, for example, may associate the marker 100 to the location 138 and to the identity 140 of each three-dimensional structure 42. The table 150 may also associate the magnet 90 to a companion marker 160 associated with the magnetically attracted companion structure (illustrated as reference numeral 112 in FIG. 4). That is, the table 150 may store an association between the marker 100 of each three-dimensional structure 42 and the companion marker 160 of its neighboring magnetically attracted companion structure 112. The table 150 thus logically stores what building blocks 26 are magnetically attracted to each other.

As FIG. 5 also illustrates, the table 150 may also store a magnetic bond 170 for each three-dimensional structure 42. Because each three-dimensional structure 42 may be magnetically attracted to its corresponding companion structure (illustrated as reference numeral 112 in FIG. 4), the magnetic bond 170 describes the strength of magnetic attraction. The magnetic bond 170, for example, may have a value that indicates a strong (or perhaps unbreakable) magnetic attraction, meaning adjacent three-dimensional structures are logically and/or physically fused together. A strong magnetic attraction between adjacent three-dimensional structures, in other words, may imply that a pair (or more) of building blocks 26 must remain together, or move together, on the interactive display 22. A weak magnetic bond 170, conversely, may have a lesser value that indicates a weak (or perhaps breakable) magnetic attraction between adjacent three-dimensional structures 42. A weakly attracted pair (or more) of building blocks 26 may be separately moved on the interactive display 22. The magnetic bond 170 may thus have different numerical values that describe magnetic attraction between adjacent three-dimensional structures.

The magnetic bond 170 may thus be a logical and/or physical value. The magnetic bond 170, for example, may be related or associated to the magnetic properties of the magnet

90. A strong permanent magnet may have a high value of the magnet bond 170, whereas a weak magnet may have a low value of the magnetic bond 170. The magnetic bond 170, however, may be a logical or software parameter that has little or no relationship to the actual magnetic properties of the magnet 90. The user of the surface computer 20 may arbitrarily define any three-dimensional structure 42 to have the strong magnetic bond 170, even those in which the actual magnet 90 has weak magnetic properties. Any three-dimensional structure 42, likewise, may have a weak magnetic bond 170 despite strong, physical magnetic properties. The user may thus access, modify, and/or populate the table 150 to achieve any bonding desired between the building blocks 26.

Figure 6:
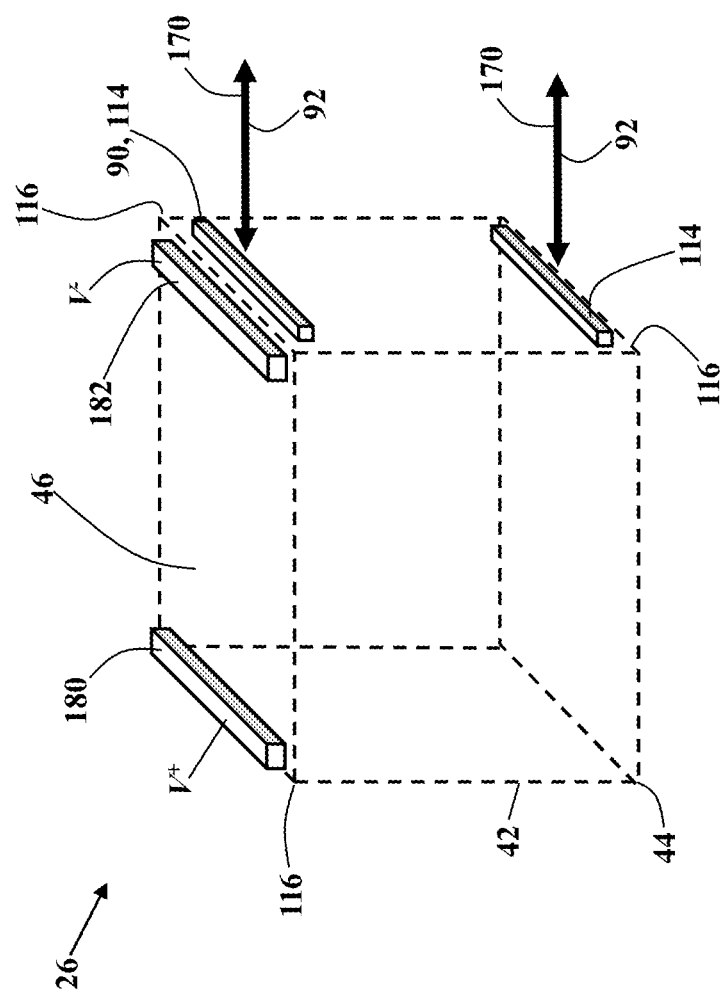
FIG. 6 is a schematic illustrating a magnet, according to exemplary embodiments.

FIG. 6 is a schematic further illustrating the magnet 90, according to exemplary embodiments. Here again the magnet 90 is illustrated as the edge magnets 114 that may be embedded or molded into the three-dimensional structure 42 (simply illustrated as the cube 44). Each edge magnet 114 protrudes near or at one of the corner edges 116 of the three-dimensional structure 42 (e.g., the six-sided cube 44). FIG. 6, though, illustrates the edge magnets 114 as electromagnets, such that the attractive force 92 varies with current. The three-dimensional structure 42 may thus have a positive electrical terminal 180 and a negative electrical terminal 182. The terminals 180 and 182 are illustrated as longitudinal strip terminals that are aligned along, at, or near one of the corner edges 116 of the three-dimensional structure 42. The terminals 180 and 182, though, may have any shape, configuration, and/or orientation for conducting electrical voltage and current to the magnet(s) 90. The positive electrical terminal 180 has an electrical connection to each magnet 90, while the negative electrical terminal 182 has another electrical connection to each magnet 90. A voltage differential between the positive electrical terminal 180 and the negative electrical terminal 182 varies the attractive force 92 produced by the electromagnet 90. The physical magnetic bond 170 may thus be related or associated to the attractive force 92 produced by the electromagnet 90.

Still, though, the user may define or override the physical properties of the electromagnet 90. Even though the attractive force 92 may physically vary according to current flowing from the positive electrical terminal 180 to the negative electrical terminal 182, the user may define the magnetic bond 170 for the three-dimensional structure 42. Recall that the magnetic bond 170 may be a logical or software parameter that has little or no relationship to the actual magnetic properties of the electromagnet 90. The user of the surface computer 20 may arbitrarily define the magnetic bond 170 in the table (illustrated as reference numeral 150 in FIG. 5). Exemplary embodiments thus permit greater configuration options when arranging the building blocks 26 on the interactive display 22.

FIGS. 7-8 are more schematics illustrating the electromagnet 90, according to exemplary embodiments. FIG. 7 illustrates a series electrical connection from the positive electrical terminal 180, through the electromagnets 90 and/or 114, and to the negative electrical terminal 182. The positive electrical terminal 180 and the negative electrical terminal 182 may thus be electrical power rails 184 that are exposed along the exterior surface 46 of the three-dimensional structure 42. The positive electrical terminal 180 may even protrude above the exterior surface 46 of the three-dimensional structure 42. The negative electrical terminal 182, likewise, may also protrude above the exterior surface 46 of the three-dimensional structure 42. The positive electrical terminal 180 may be parallel to, not parallel to, or orthogonal to the negative electrical terminal 182. The positive electrical terminal 180 electrically connects to the magnet 90, while the negative electrical terminal 182 also electrically connects to the magnet 90. Current flow varies the attractive force 92, but the user of the surface computer 20 may arbitrarily define the magnetic bond 170 in the table 150 (as previous paragraphs explained). The positive electrical terminal 180 and the negative electrical terminal 182, however, may having any configuration that suits any design objective. As FIG. 8 illustrates, for example, the positive electrical terminal 180 and the negative electrical terminal 182 as threaded posts.

FIGS. 9A and 9B are more schematics illustrating electrical transfer and magnetic attraction, according to exemplary embodiments. FIG. 9A illustrates a first companion structure 190 stacked above the three-dimensional structure 42. When the electrical power rails 184 in the three-dimensional structure 42 contact the corresponding electrical power rails 184 in the first companion structure 190, then electrical current and/or voltage is transferred. FIG. 9A illustrates a battery 192 as a source of the electrical power, and the electrical power is provided to a light source 194 in the first companion structure 190. If the first companion structure 190 is molded of a clear or transparent material (such as an acrylic material), then the first companion structure 190 may be lit from electrical power delivered by the three-dimensional structure 42. The source of the electrical power, however, may be another building block 26 or some connection to a master power source. Moreover, the first companion structure 190 need not be stacked above the three-dimensional structure 42, as electrical power may be transferred using any adjacent configuration.

FIG. 9A also illustrates magnetic attraction. The magnets 90, 114 in the three-dimensional structure 42 may magnetically attract the magnetic material 110 in a second companion structure 196. When the magnets 90 (or 114) and 110 align, the attractive force 92 draws (or repels) the three-dimensional structure 42 and the second companion structure 196, as is known.

FIG. 9B also illustrates electrical transfer and magnetic attraction. Here, though, the three-dimensional structure 42 may magnetically attract, and also provide electrical power to, the first companion structure 190. The three-dimensional structure 42 may be designed and fabricated such that the electrical power rails 184 and the magnets 90, 114 protrude from the same side 198. The side 198 of the cube 44, for example, magnetically attracts the magnetic material 110 in the first companion structure 190. Because the electrical power rails 184 in the three-dimensional structure 42 also contact the corresponding electrical power rails 184 in the first companion structure 190, electrical current and/or voltage is transferred. FIG. 9B again illustrates the battery 192 supplying current and voltage to the light source 194 in the first companion structure 190.

FIG. 10 is another schematic illustrating the three-dimensional structure 42, according to exemplary embodiments. Here the three-dimensional structure 42 is again illustrated as the six-sided block or cube 44. The three-dimensional structure 42, though, may have a solid core or interior 60 that is molded of any material (such as transparent or tinted, semi-transparent acrylic). At least one side 200 of the three-dimensional structure 42 has a recessed well 202 into which the magnet 90 is placed. The well 202 has an outer wall 204 and a floor 206. The outer wall 204 may have a shape that matches an outline or shape of the magnet 90. FIG. 10 illustrates the magnet 90 having a circular shape, but the magnet 90 may have any shape (such as the elongate edge magnets 114 illustrated in FIG. 6). The outer wall 204 has a depth or thickness 208 that may approximately match the magnet 90. The outer wall 204 and/or the depth or thickness 208 may be chosen such that the magnet 90 and the recessed well 202 have a snug or snap-fit relationship. The magnet 90 may be inserted into, and/or removed from, the recessed well 202. Different magnets, with different properties, may thus be inserted into and removed from the three-dimensional structure 42 to suit any desire.

Figure 11:
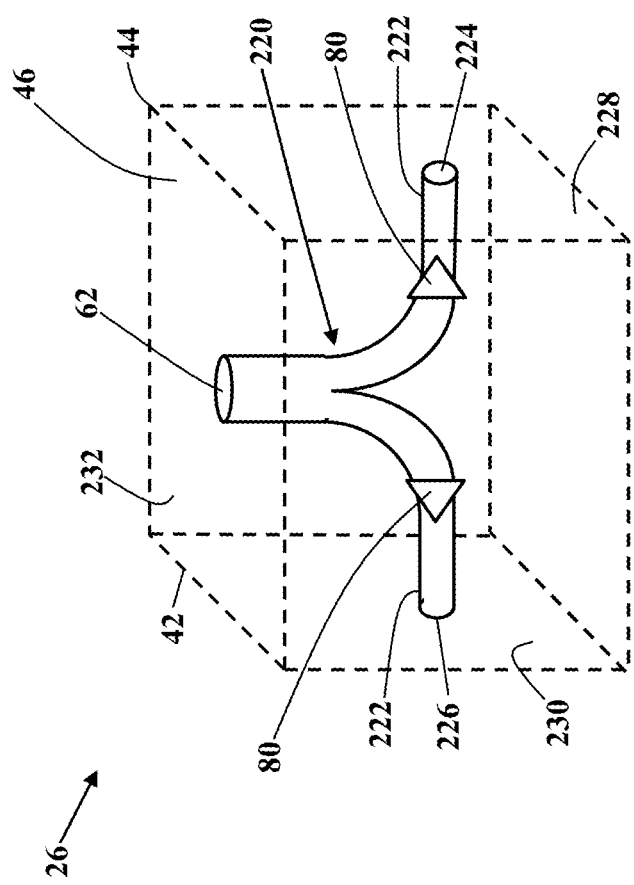
FIG. 11 is a schematic further illustrating a bundle of optical fibers, according to exemplary embodiments.
Figure 12:
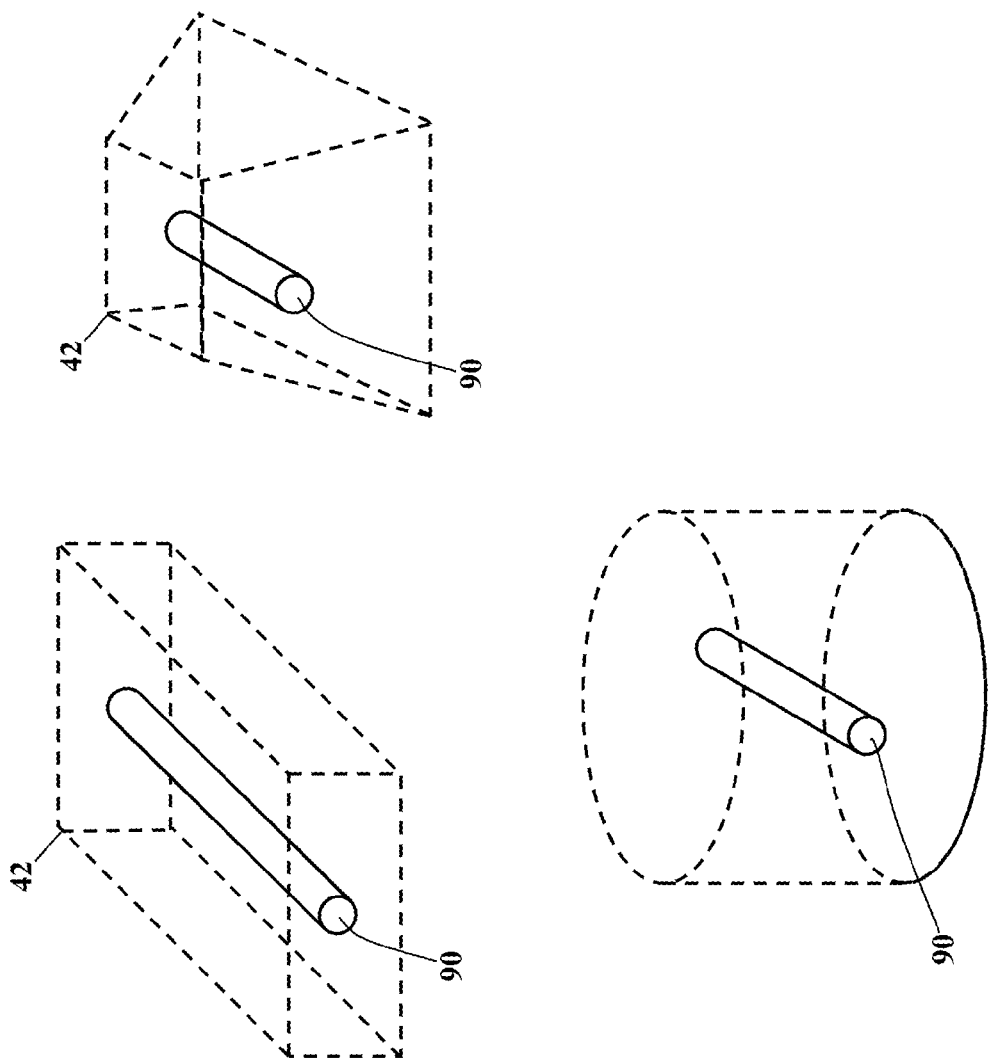
FIG. 12 is another schematic illustrating the three-dimensional structure, according to exemplary embodiments.

FIG. 11 is a schematic further illustrating the bundle 62 of optical fibers, according to exemplary embodiments. Here the bundle 62 of optical fibers may be bent to any configuration. As FIG. 12 illustrates, the bundle 62 of optical fibers may have a split 220 between two or more groups 222 of optical fibers. A first group 224 of optical fibers, for example, propagates the light 80 to a first location on the exterior surface 46 of the three-dimensional structure 42, while a second group 226 of optical fibers propagates the light 80 to a second location on the exterior surface 46 of the three-dimensional structure 42. Because the three-dimensional structure 42 is again illustrated as the six-sided block or cube 44, the first group 224 of optical fibers, for example, propagates the light 80 to a first side 228, while the second group 226 of optical fibers propagates the light 80 to an opposite, second side 230. The split 220 is illustrated as a "Y" configuration that turns the bundle 62 of optical fibers ninety degrees (90°) from an entry side 232. The first group 224 of optical fibers and/or the second group 226 of optical fibers, though, may have any angular orientation that propagate the light 80 to any side having a perpendicular or parallel arrangement. Exemplary embodiments may split the bundle 62 of optical fibers into three or more groups that propagate the light 80 to three or more sides of the exterior surface 46 of the three-dimensional structure 42. Moreover, the number of optical fibers in each group (such as 224 and 226) may be equal or unequal. The number of individual optical fibers in the first group 224 of optical fibers, for example, may have a greater number of optical fibers to increase resolution of the light 80 propagated through the first group 224 of optical fibers. That is, the first group 224 of optical fibers may have a greater percentage of the total number of optical fibers to better convey an image or marker.

FIG. 12 is another schematic illustrating the three-dimensional structure 42, according to exemplary embodiments. FIG. 12 illustrates the three-dimensional structure 42 may have any exterior shape, such as a triangular shape, rectangular shape, hexagonal shape, or any other desired shape. Whatever the exterior shape of the three-dimensional structure 42, the magnet 90 may be included (as above described) to magnetically attract other building blocks 26.

Figure 13:
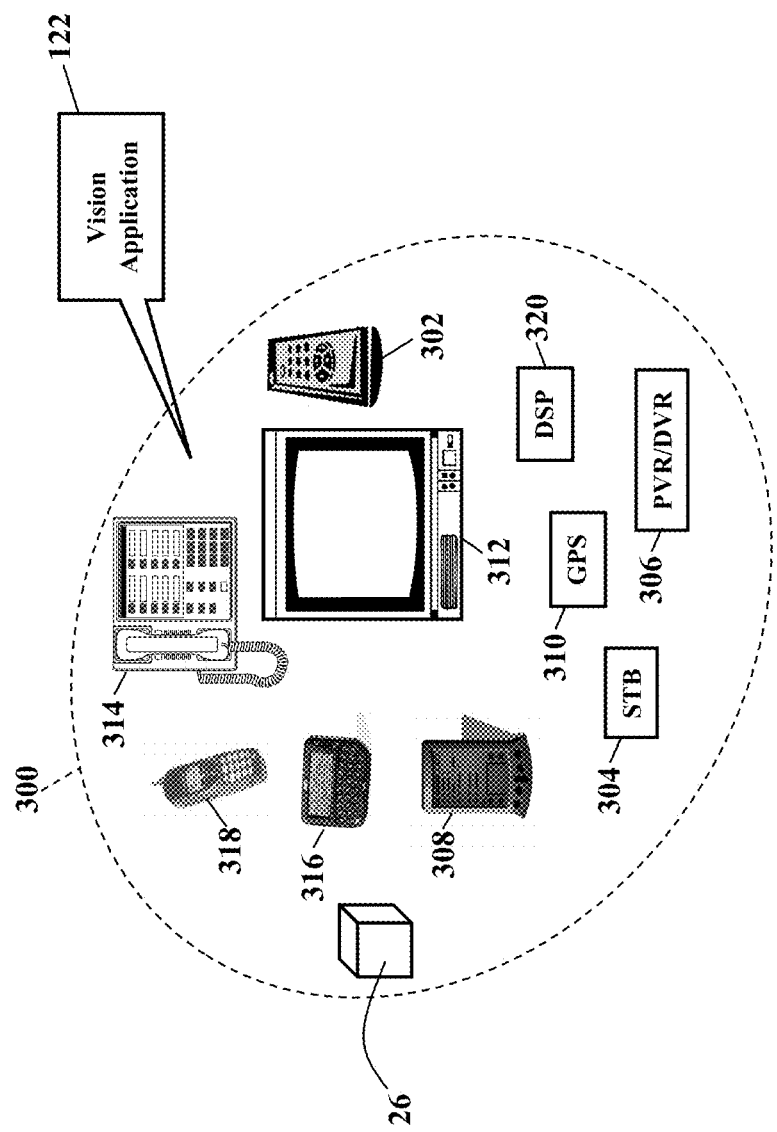
FIG. 13 depicts other possible operating environments for additional aspects of the exemplary embodiments

FIG. 13 depicts other possible operating environments for additional aspects of the exemplary embodiments. FIG. 13 illustrates that the building block 26 may be utilized with any processor-controlled device 300. FIG. 13, for example, illustrates that the building block 26 and/or the vision application 132 may entirely or partially operate with a remote control 302, a set-top box ("STB") 304, a personal/digital video recorder (PVR/DVR) 306, a personal digital assistant (PDA) 308, a Global Positioning System (GPS) device 310, an interactive television 312, an Internet Protocol (IP) phone 314, a pager 316, a cellular/satellite phone 318, or any computer system, communications device, or processor-controlled device utilizing the processor 40 and/or a digital signal processor (DP/DSP) 320. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for defining magnetic bonds between building blocks, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. An apparatus, comprising:
   a three-dimensional building block for table top computing, the three-dimensional building block having an exterior surface and an interior;
   a bundle of optical fibers for propagating light through the interior to the exterior surface of the three-dimensional building block;
   a magnet in the three-dimensional building block, the magnet producing an attractive force; and
   a marker on the exterior surface of the three-dimensional building block, the marker displaying information that uniquely identifies the three-dimensional building block and that uniquely identifies a strength associated with the attractive force produced by the magnet.

2. The apparatus according to claim 1, further comprising:
   a processor executing code stored in a memory that causes the processor to store an electronic table in the memory, the electronic table having electronic associations between the marker and different identifiers associated with different companion structures that are magnetically attracted by the attractive force produced by the magnet.

3. The apparatus according to claim 1, further comprising:
   a processor executing code stored in a memory that causes the processor to store an electronic table in the memory, the electronic table having electronic associations between the strength associated with the attractive force produced by the magnet and different values of magnetic bonds associated with different companion structures.

4. The apparatus according to claim 1, further comprising a bend in the bundle of optical fibers.

5. The apparatus according to claim 1, wherein a first group of optical fibers formed by the split propagates the light to a first location on the exterior surface of the three-dimensional building block, and wherein a second group of optical fibers formed by the split propagates the light to a second location on the exterior surface of the three-dimensional building block.

6. The apparatus according to claim 1, wherein the magnet is electromagnetic such that the attractive force varies with voltage.

7. The apparatus according to claim 1, further comprising an electric power rail exposed along the exterior surface, the electric power rail when energized providing a voltage to the magnet to vary the attractive force.

8. A method, comprising:
   propagating an image through a bundle of optical fibers in a three-dimensional building block for table top computing, the bundle of optical fibers propagating the image from a first location on an exterior surface of the three-dimensional building block to a second location on the exterior surface;

producing an attractive force by a magnet in the three-dimensional building block;

marking the exterior surface of the three-dimensional building block with a marker, the marker uniquely identifying a bonding strength associated with the attractive force produced by the magnet; and conveying the marker via light propagating along a fiber in the bundle of optical fibers.

9. The method according to claim 8, further comprising splitting the bundle of optical fibers into a first group of optical fibers and a second group of optical fibers.

10. The method according to claim 8, further comprising storing an association in a memory between the image and the marker.

11. The method according to claim 8, further comprising storing an association in a memory between an identifier of the three-dimensional building block and another identifier of a companion structure magnetically attracted by the attractive force produced by the magnet.

12. The method according to claim 8, further comprising storing an association in a memory between an identifier of the marker and another identifier of a companion structure magnetically attracted by the attractive force produced by the magnet.

13. The method according to claim 8, further comprising bending the bundle of optical fibers.

14. The method according to claim 8, further comprising varying the strength of the attractive force produced by the magnet with a voltage.

15. The method according to claim 8, further comprising exposing an electric power rail on the exterior surface of the three-dimensional building block to provide a voltage to the magnet to vary the attractive force.

16. A memory device storing code which when executed causes a processor to perform operations, the operations comprising:

receiving a digital image of an interactive display, the digital image revealing a three-dimensional building block propagating light through a bundle of optical fibers from a first location on an exterior surface of the three-dimensional building block to a second location on the exterior surface of the three-dimensional building block;

determining, from the digital image, a marker on the exterior surface of the three-dimensional building block, the marker conveyed by the light propagating from a split in the bundle of optical fibers;

querying an electronic map for the marker, the electronic map having electronic associations between different values of magnetic bonds and different companion markers associated with companion structures including the marker determined from the digital image;

retrieving values of magnetic bonds from the electronic map, each one of the values of magnetic bonds having an electronic association with the marker determined from the digital image, the each one of the values of magnetic bonds describing a strength of magnetic attraction with a corresponding companion structure that is magnetically attracted to the three-dimensional building block revealed in the digital image; and associating the strength of magnetic attraction to a companion marker associated with the corresponding companion structure.

17. The memory device according to claim 16, wherein the operations further comprise associating the marker to the companion marker.

18. The memory device according to claim 17, wherein the operations further comprise associating the strength of magnetic attraction to a location of the three-dimensional building block on the interactive display.

19. The memory device according to claim 16, wherein the operations further comprise associating the strength of magnetic attraction to a location associated with the companion structure on the interactive display.

20. The memory device according to claim 19, wherein the operations further comprise associating a voltage to the strength of magnetic attraction.

* * * * *